US012583590B2

(12) United States Patent
Kilchyk et al.

(10) Patent No.: US 12,583,590 B2
(45) Date of Patent: Mar. 24, 2026

(54) ENVIRONMENTAL CONTROL SYSTEMS FOR AN AIRCRAFT HAVING A VAPOR COMPRESSION SYSTEM WITH A FLASH LIQUID EXPANDER TURBINE

(71) Applicant: Hamilton Sundstrand Corporation, Charlotte, NC (US)

(72) Inventors: Viktor Kilchyk, Lancaster, NY (US); Jeffrey Ernst, Wethersfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 83 days.

(21) Appl. No.: 18/585,780

(22) Filed: Feb. 23, 2024

(65) Prior Publication Data

US 2025/0269967 A1 Aug. 28, 2025

(51) Int. Cl.
B64D 13/06 (2006.01)
F25B 5/02 (2006.01)
(Continued)

(52) U.S. Cl.
CPC ............... B64D 13/06 (2013.01); F25B 5/02 (2013.01); F25B 9/004 (2013.01); F25B 9/06 (2013.01);
(Continued)

(58) Field of Classification Search
CPC .... F25B 5/02; F25B 9/004; F25B 9/06; F25B 25/005; F25B 2400/06; B64D 13/06;
(Continued)

(56) References Cited

U.S. PATENT DOCUMENTS 4,463,567 A 8/1984 Amend et al.
5,467,613 A 11/1995 Brasz
(Continued)

FOREIGN PATENT DOCUMENTS

EP 2272757 A2 1/2011
EP 2889558 A1 7/2015
JP 2019157655 A 9/2019

OTHER PUBLICATIONS

Extended European Search Report for EP Application No. 25157123. 8, dated Jul. 15, 2025, pp. 1-8.
(Continued)

*Primary Examiner* — Miguel A Diaz
(74) *Attorney, Agent, or Firm* — CANTOR COLBURN LLP

(57) ABSTRACT

An environmental-control-system (ECS) for delivering ECS supply air to a cabin having: a first mixer that receives the ECS supply air; a first vapor-cycle-system (VCS) coupled to the first mixer and includes: a first working fluid; a first compressor; a first condenser; a first turbine that is a flash-liquid-expander (FLE) turbine, that receives the first working fluid as a liquid and outputs the first working fluid as a two-phase mixture; a first interconnecting shaft coupling the first compressor and the first turbine; a first evaporator; a second mixer; a bypass connected in parallel with the first VCS, between the first mixer and the second mixer; and in predetermined operational conditions: the first mixer directs the ECS supply air to the second mixer via one or both of the first VCS and the bypass; and the second mixer directs the ECS supply air to the cabin.

18 Claims, 9 Drawing Sheets

(51) Int. Cl.
F25B 9/00 (2006.01)
F25B 9/06 (2006.01)
F25B 25/00 (2006.01)

(52) U.S. Cl.
CPC .... F25B 25/005 (2013.01); *B64D 2013/0648*
(2013.01); *F25B 2400/06* (2013.01)

(58) Field of Classification Search
CPC ........... B64D 13/08; B64D 2013/0603; B64D
2013/0625; B64D 2013/064; B64D
2013/0648
See application file for complete search history.

(56) References Cited

U.S. PATENT DOCUMENTS

| | | | | |
|---|---|---|---|---|
| 5,967,461 A | * | 10/1999 | Farrington ............ | B64D 13/06 |
| | | | | 454/115 |
| 2016/0208742 A1 | | 7/2016 | Pande | |
| 2017/0058773 A1 | | 3/2017 | Vaisman | |
| 2019/0359339 A1 | | 11/2019 | Pachidis et al. | |
| 2022/0250753 A1 | | 8/2022 | Galzin et al. | |
| 2023/0080053 A1 | * | 3/2023 | Emerson ................ | B64D 37/34 |
| | | | | 62/401 |

OTHER PUBLICATIONS

Visentin et al., "Flashing Liquid Expander Energy Reduction in
Refrigeration Systems", Purdue University, 17th International Refrig-
eration and Air Conditioning Conference at Purdue, Jul. 2018, pp.
1-11.

* cited by examiner

35

50

200

50

135

140

160

165

185

170

36

130A

235

130B

230

130

ENVIRONMENTAL CONTROL SYSTEMS FOR AN AIRCRAFT HAVING A VAPOR COMPRESSION SYSTEM WITH A FLASH LIQUID EXPANDER TURBINE

BACKGROUND

Embodiments described herein are directed to environmental control systems (ECS) for an aircraft and more specifically to an ECS having a vapor compression system (VCS) with a flash liquid expander (FLE) turbine.

An ECS may include multiple air cycle machines (ACMs) to condition air bled from an engine or cabin air compressor (CAC) and which is directed toward a cabin of the aircraft. However, using an ACM to condition air can be inefficient.

BRIEF SUMMARY

Disclosed is an environmental control system (ECS) of an aircraft for delivering ECS supply air to a cabin, the system comprising: an ECS controller; a first mixer that is operationally coupled to the ECS controller, the first mixer receives the ECS supply air; a first vapor cycle system (VCS) that is downstream of the first mixer and fluidly coupled to the first mixer, wherein, the first VCS includes: a first working fluid; a first compressor; a first condenser located downstream of the first compressor; a first turbine that is a flash liquid expander (FLE) turbine, located downstream of the first condenser, that receives the first working fluid as a liquid and outputs the first working fluid as a two-phase mixture; a first interconnecting shaft coupling the first compressor and the first turbine; and a first evaporator located downstream of the first turbine and upstream of the first compressor; and a second mixer located downstream of the first VCS and operationally coupled to the ECS controller, a bypass connected in parallel with the first VCS, between the first mixer and the second mixer, wherein, in operation: the ECS controller, in predetermined operational conditions, controls the first mixer to direct the ECS supply air to the second mixer via one or both of the first VCS and the bypass; and the second mixer directs the ECS supply air to the cabin.

In addition to one or more aspects of the system, or as an alternate, the first working fluid is refrigerant.

In addition to one or more aspects of the system, or as an alternate, the system includes a first drive operationally coupled to the first compressor, and configured to operate in a first mode to drive the first compressor and in a second mode to be driven by the first turbine.

In addition to one or more aspects of the system, or as an alternate, the first VCS further includes a first auxiliary heat exchanger located between the first condenser and the first turbine and configured to cool air from an auxiliary heat source.

In addition to one or more aspects of the system, or as an alternate, the first VCS includes a second evaporator coupled in parallel with the first evaporator, between the first compressor and the first turbine; a first fan that is configured to direct cabin air to the second mixer via the second evaporator of the first VCS to condition the cabin air, and wherein the cabin air and the ECS supply air are isolated from each other in the first VCS.

In addition to one or more aspects of the system, or as an alternate, the system includes an air cycle machine (ACM), connected in parallel with the first VCS, between the first mixer and the second mixer, wherein, in operation: the ECS controller, in predetermined operational conditions, controls the first mixer to direct the ECS supply air to the second mixer via one or more of the first VCS, the bypass and the ACM; and the second mixer directs the ECS supply air to the cabin In addition to one or more aspects of the system, or as an alternate, the ACM includes: an ACM compressor; an ACM turbine located downstream of the ACM compressor; an ACM interconnecting shaft coupling the ACM compressor and the ACM turbine, wherein, in operation: the ACM compressor receives the ECS supply air from the first mixer, compresses the ECS supply air, and directs the ECS supply air toward the ACM turbine; and the ACM turbine drives the ACM compressor and directs the ECS supply air toward the second mixer.

In addition to one or more aspects of the system, or as an alternate, the first VCS includes a second auxiliary heat exchanger located between the first condenser and the first turbine; and the second auxiliary heat exchanger is coupled to the ACM compressor and the ACM turbine, whereby the second auxiliary heat exchanger is configured to condition the ECS supply air.

In addition to one or more aspects of the system, or as an alternate, the ACM includes a RAM air heat exchanger coupled to the to the ACM compressor and the ACM turbine, to provide supplemental conditioning of the ECS supply air.

In addition to one or more aspects of the system, or as an alternate, the ACM further includes: an ACM drive operationally coupled to the ACM compressor, and configured to operate in a first mode to drive the ACM compressor and in a second mode to be driven by the ACM turbine.

In addition to one or more aspects of the system, or as an alternate, the system includes a second VCS, connected in parallel with the first VCS, between the first mixer and the second mixer, wherein, in operation: the ECS controller, in predetermined operational conditions, controls the first mixer to direct the ECS supply air to the second mixer via one or more of the first VCS, the bypass and the second VCS; and the second mixer directs the ECS supply air to the cabin.

In addition to one or more aspects of the system, or as an alternate, the second VCS includes: a second VCS working fluid; a second VCS compressor; a second VCS turbine located downstream of the second VCS compressor; a second VCS interconnecting shaft coupling the second VCS compressor and the second VCS turbine; and a second VCS evaporator located downstream of the second VCS turbine and upstream of the second VCS compressor, wherein, in operation: the ECS controller, in predetermined operational conditions, controls the first mixer to direct the ECS supply air to the second mixer via the one or more of the first VCS, the bypass and the second VCS where and the second VCS evaporator in the second VCS conditions the ECS supply air; and the second mixer directs the ECS supply air to the cabin.

In addition to one or more aspects of the system, or as an alternate, the second VCS turbine is an FLE turbine.

In addition to one or more aspects of the system, or as an alternate, the second VCS working fluid is refrigerant.

In addition to one or more aspects of the system, or as an alternate, the first VCS includes a third auxiliary heat exchanger located between the first condenser and the first turbine, and the third auxiliary heat exchanger is coupled to the second VCS compressor and the second VCS turbine, whereby the third auxiliary heat exchanger is configured to condition the second VCS working fluid.

In addition to one or more aspects of the system, or as an alternate, the second VCS includes a second VCS condenser coupled to the to the second VCS compressor and the second VCS turbine, to provide supplemental conditioning of the second VCS working fluid.

In addition to one or more aspects of the system, or as an alternate, the second VCS further includes: a second VCS drive operationally coupled to the second VCS compressor, and configured to operate in a first mode to drive the second VCS compressor and in a second mode to be driven by the second VCS turbine.

In addition to one or more aspects of the system, or as an alternate, the first VCS includes a third evaporator coupled in parallel with the first evaporator and the second evaporator, between the first compressor and the first turbine; a second fan that is configured to direct cargo bay air from a cargo bay to the first VCS, for conditioning via the third evaporator, and back to the cargo bay, and wherein the cabin air, the ECS supply air and the cargo bay air are isolated from each other in the first VCS.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
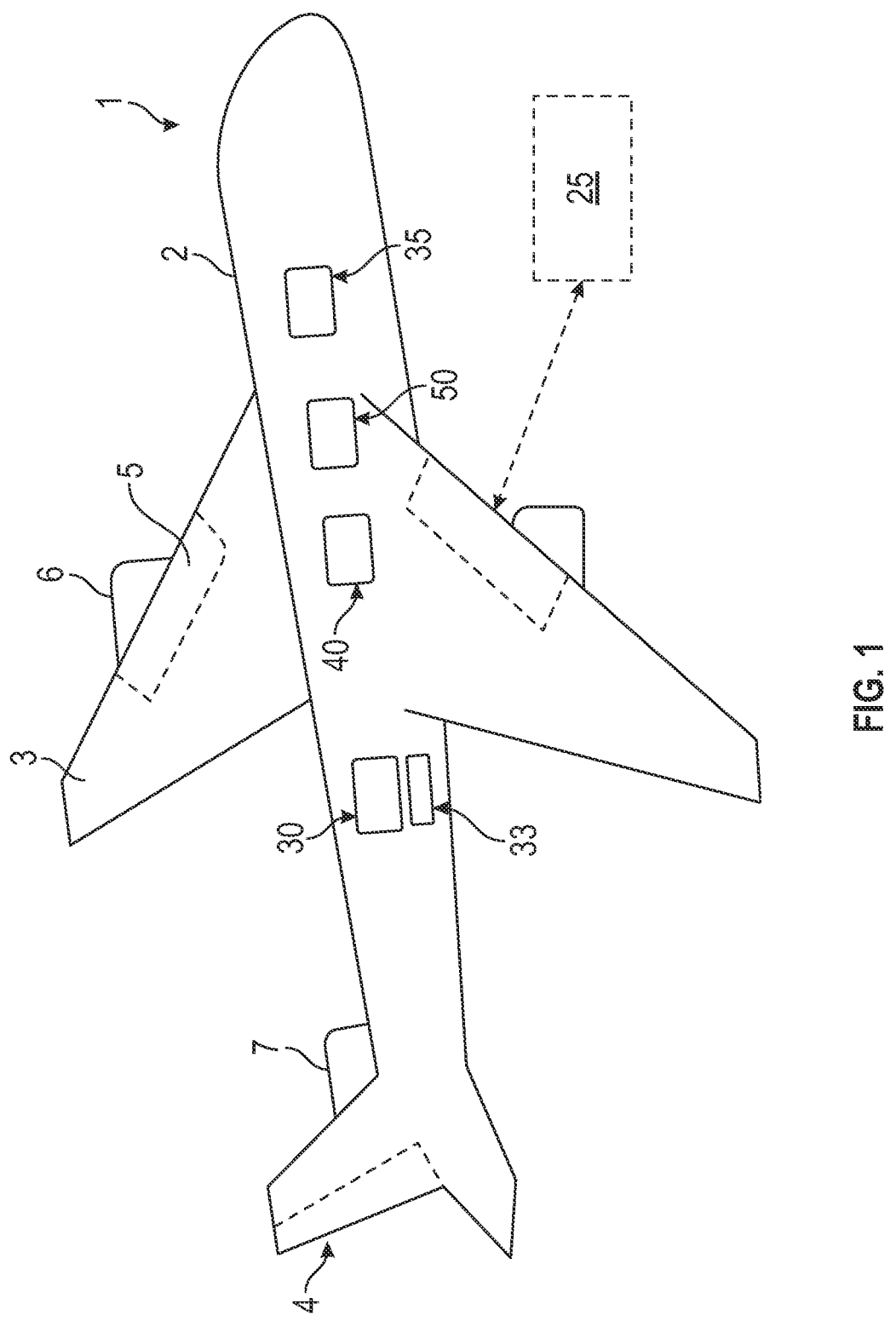
FIG. 1 shows an aircraft according to an embodiment.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have an air cycle machine 25, a cabin 30 over a cargo bay 33, an environmental control system (ECS) 35 that delivers ECS supply air 36 to the cabin 30. The aircraft may include a cabin air compressor (CAC) 40 and an auxiliary system (or auxiliary heat source) 50 such as aircraft electronics. The ECS 35 may receive the ECS supply air 36 from the engine 6 or the CAC 40, as nonlimiting examples.

Figure 2:
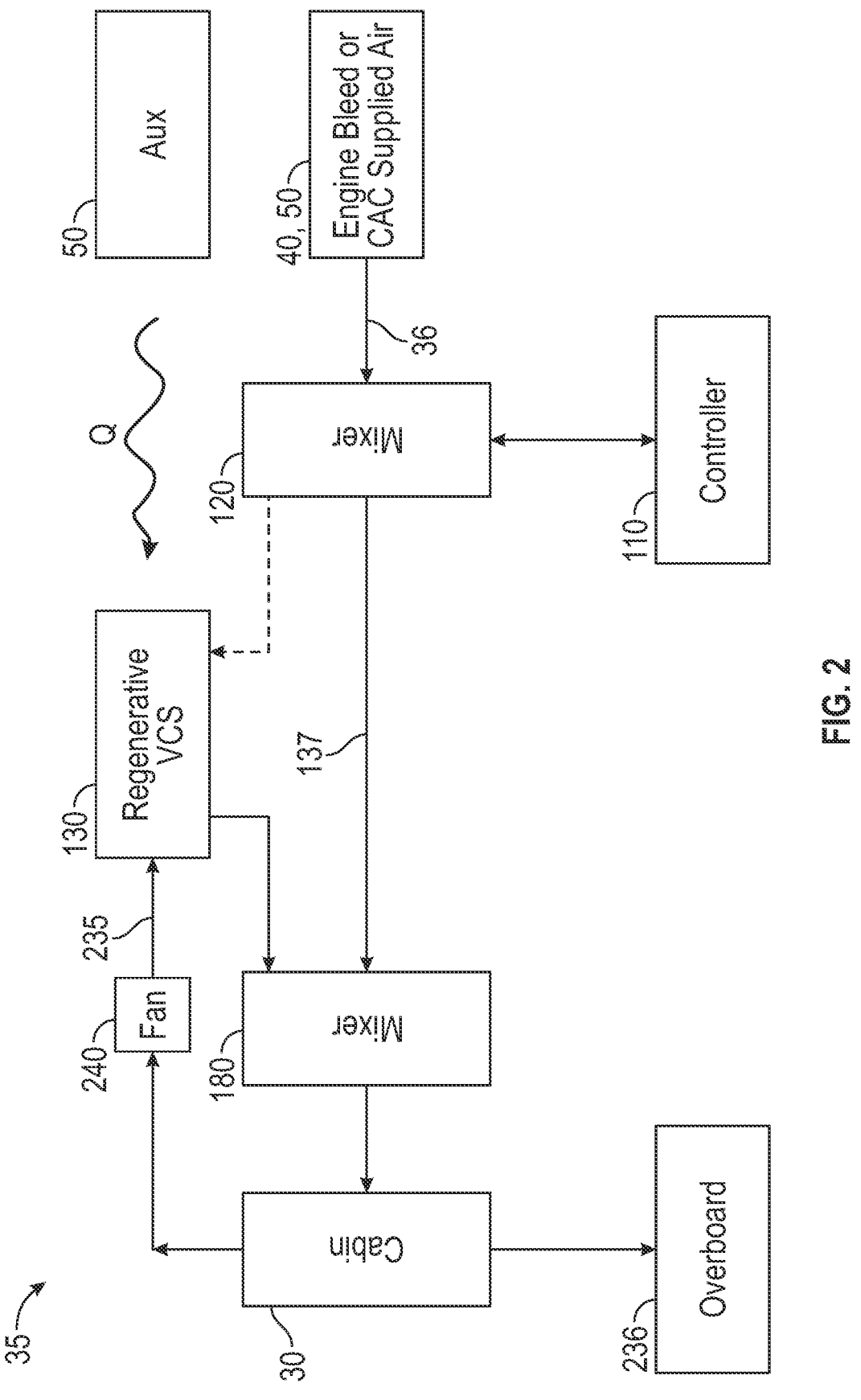
FIG. 2 shows an ECS according to an embodiment, which includes a first regenerative vapor compression system (VCS) to condition air that is directed to a cabin.
Figure 3:
FIG. 3 shows components of the first VCS, in which heat from an auxiliary system are utilized to heat a first working fluid entering a first turbine of the VCS, where the first turbine is flash liquid expander (FLE) turbine.

Turning to FIGS. 2 and 3, in one embodiment the ECS 35 includes an ECS controller 110. A first mixer 120 is operationally coupled to the ECS controller 110. The first mixer 120 receives the ECS supply air 36. A first vapor cycle system (VCS) 130 is downstream of the first mixer 120 and fluidly coupled to the first mixer 120.

The first VCS 130 includes a first working fluid 135 such as refrigerant. The first VCS 130 includes a first compressor 140, a first condenser 150 located downstream of the first compressor 140, and a first turbine 160 that is a flash liquid expander (FLE) turbine, located downstream of the first condenser 150. Utilization of the FLE turbine results in the VCS being a regenerative VCS. The first turbine 160 receives the first working fluid 135 as a liquid and outputs the first working fluid 135 as a two-phase mixture. A first interconnecting shaft 165 couples the first compressor 140 and the first turbine 160. A first evaporator 170 is located downstream of the first turbine 160 and upstream of the first compressor 140. A second mixer 180 is located downstream of the first VCS 130 and operationally coupled to the ECS controller 110. A bypass 137 is connected in parallel with the first VCS 130, between the first mixer 120 and the second mixer 180 (i.e., the bypass 137 is connected to the first mixer 120 and the second mixer 180).

A first drive 185 operationally is coupled to the first compressor 140. The first drive is configured to operate in a first mode to drive the first compressor 140, e.g., at startup of the ECS 35, and in a second mode to be driven by the first turbine 160, e.g., once the first turbine 160 is capable of driving the first compressor 140.

In one embodiment, the first VCS 130 may further include a first auxiliary heat exchanger 200 located between the first condenser 150 and the first turbine 160. The first auxiliary heat exchanger 200 is configured to cool and condition flow, which may also be refrigerant, from the auxiliary system 50. This heats the first working fluid 135 before it enters the first turbine 160, increasing its operational efficiency.

The first VCS 130 includes a second evaporator 230 coupled in parallel with the first evaporator 170, between the first compressor 140 and the first turbine 160. A first fan 240 is configured to direct cabin air 235 to the second mixer 180 via the second evaporator 230 of the first VCS 130 to condition the cabin air 235. The cabin air 235 and the ECS supply air 36 are isolated from each other in the first VCS 130, e.g., utilizing separate ducts 130A, 130B.

In operation, the ECS controller 110, in predetermined operational conditions, controls the first mixer 120 to direct the ECS supply air 36 to the second mixer 180 via one or both of the first VCS 130 and the bypass 137. This may depend on the required temperature at the cabin 30, which may be determined via a reference temperature measured at an inlet of the cabin 30. The second mixer 180 directs the ECS supply air 36 to the cabin 30. In conditions where cabin air is not being recycled, it may be sent overboard 236.

The use of a two-phase mixture increase the coefficient of performance (COP) for the ECS 35 by up to thirty percent (30%) compared with conditioning the ECS supply air 36 with air. Further, transferring heat from the auxiliary system 50 to the first working fluid 135 heats the first working fluid 135 as it approaches the first turbine 160, increasing its efficiency. The increased efficiency of the first turbine 160 enables it to efficiently cool airflow the ECS supply air 36 via the first evaporator 170 and the cabin air 235 via the second evaporator 230. In addition the first turbine 160 is capable of running the first drive 185 in a generator mode, and energy from such mode can be used to power aircraft systems.

Figure 4:
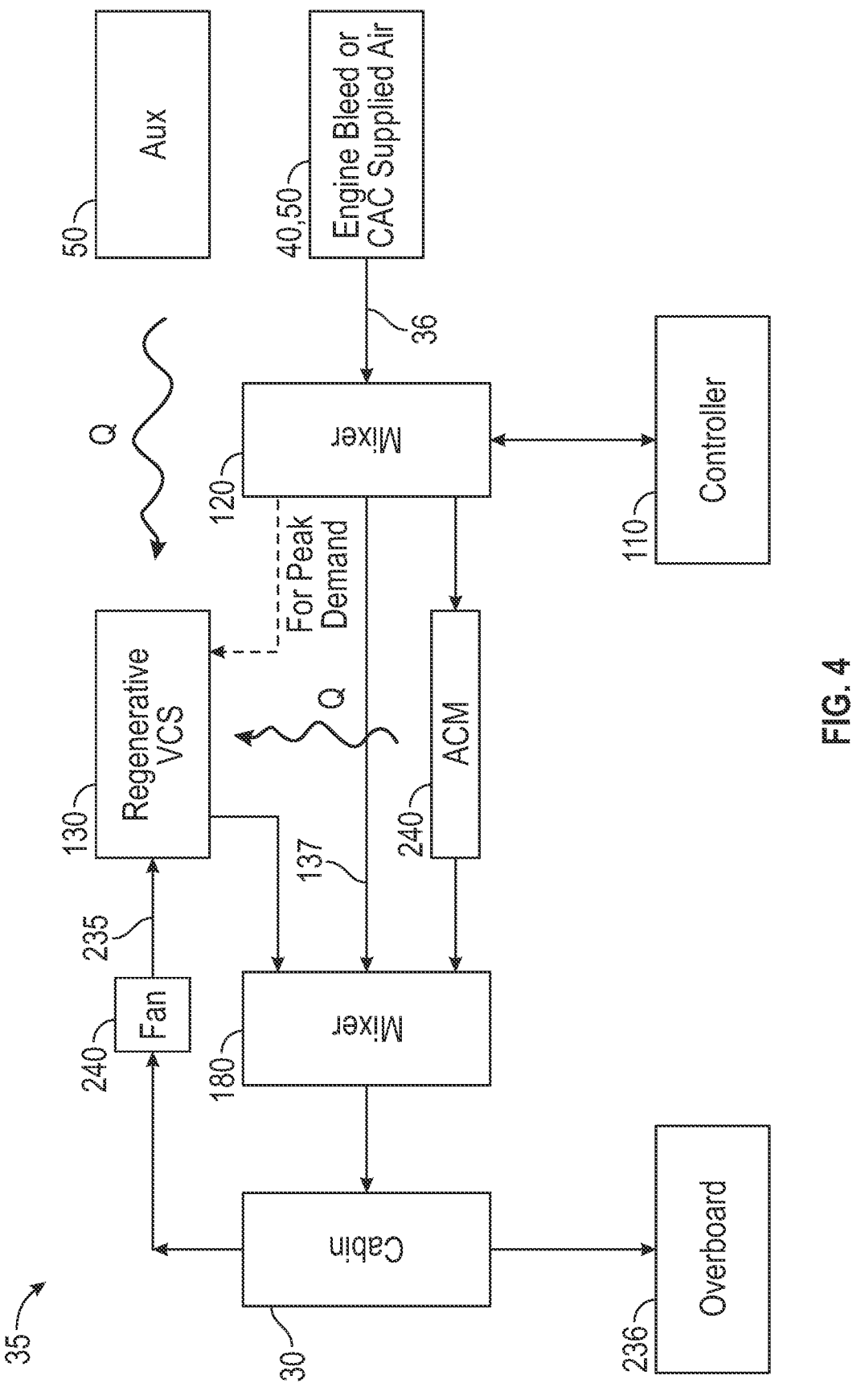
FIG. 4 shows an ECS according to an embodiment, which includes the first regenerative vapor compression system (VCS) and an air cycle machines (ACM) to condition air that is directed to a cabin.
Figure 5:
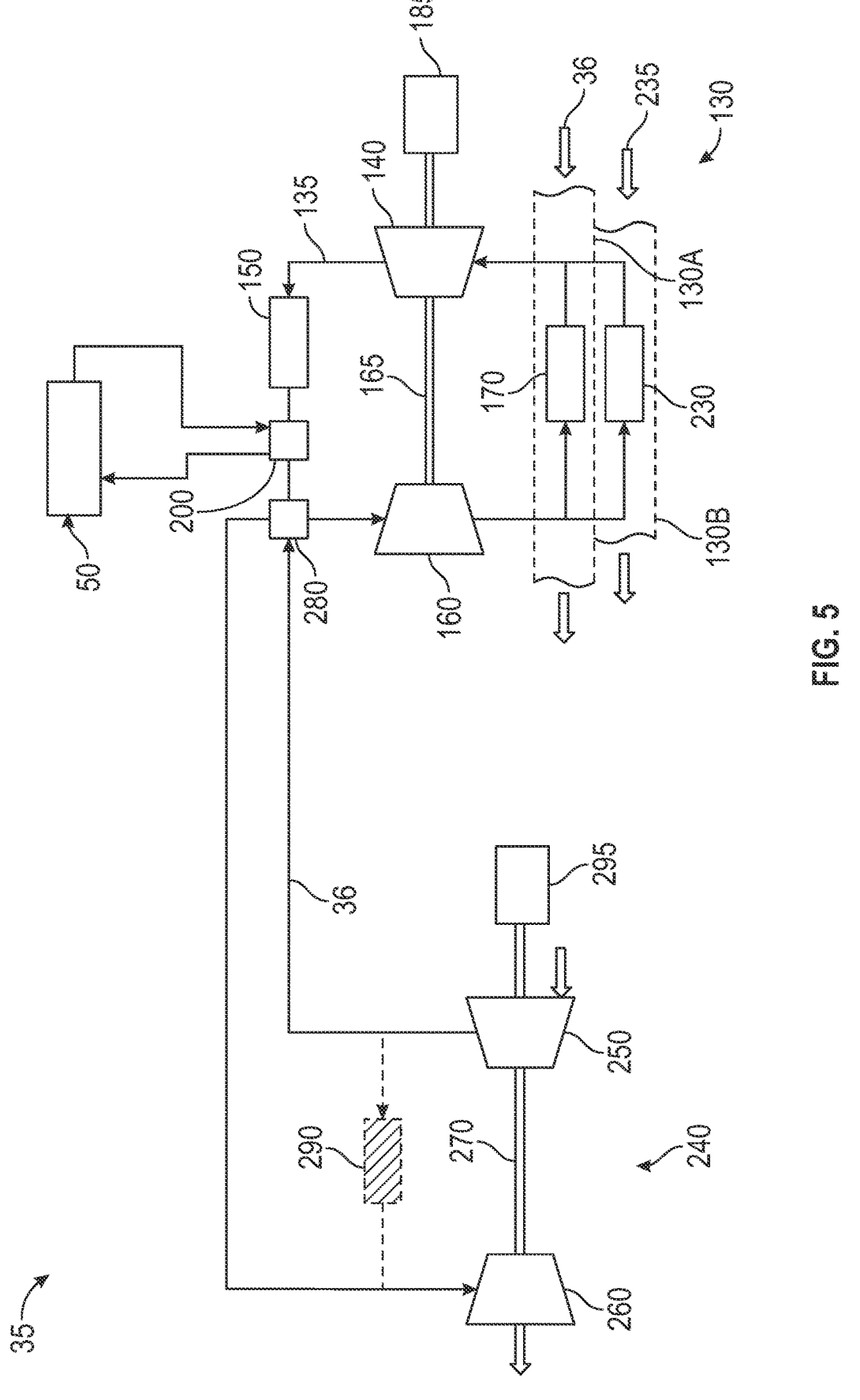
FIG. 5 shows components of the first VCS and the ACM and their interactions, in which heat from the ACM and the auxiliary system are utilized to heat a first working fluid entering a first turbine of the VCS, where the first turbine is flash liquid expander (FLE) turbine.

Turning to FIGS. 4 and 5, in one embodiment the ECS 35 includes the ECS controller 110. The first mixer 120 is operationally coupled to the ECS controller 110. The first mixer 120 receives the ECS supply air 36. The first VCS 130 is downstream of the first mixer 120 and fluidly coupled to the first mixer 120.

The first VCS 130 includes the first working fluid 135 such as refrigerant. The first VCS 130 includes the first compressor 140, the first condenser 150 located downstream of the first compressor 140, and the first turbine 160 that is a flash liquid expander (FLE) turbine, located downstream of the first condenser 150. Utilization of the FLE turbine results in the VCS being a regenerative VCS. The first turbine 160 receives the first working fluid 135 as a liquid and outputs the first working fluid 135 as a two-phase mixture. The first interconnecting shaft 165 couples the first compressor 140 and the first turbine 160. The first evaporator 170 is located downstream of the first turbine 160 and upstream of the first compressor 140. The second mixer 180 is located downstream of the first VCS 130 and operationally coupled to the ECS controller 110. The bypass 137 is connected in parallel with the first VCS 130, between the first mixer 120 and the second mixer 180.

The first drive 185 is operationally coupled to the first compressor 140. The first drive is configured to operate in the first mode to drive the first compressor 140, e.g., at startup of the ECS 35, and in the second mode to be driven by the first turbine 160, e.g., once the first turbine 160 is capable of driving the first compressor 140.

In one embodiment, the first VCS 130 may further include the first auxiliary heat exchanger 200 located between the first condenser 150 and the first turbine 160. The first heat exchanger 200 is configured to cool and condition flow, which may also be refrigerant, from the auxiliary system 50. This heats the first working fluid 135 before it enters the first turbine 160, increasing its operational efficiency.

The first VCS 130 includes the second evaporator 230 coupled in parallel with the first evaporator 170, between the first compressor 140 and the first turbine 160. The first fan 240 is configured to direct cabin air 235 to the second mixer 180 via the second evaporator 230 of the first VCS 130 to condition the cabin air 235. The cabin air 235 and the ECS supply air 36 are isolated from each other in the first VCS 130, e.g., utilizing separate ducts 130A, 130B, for avoiding cross-contamination.

Figure 6:
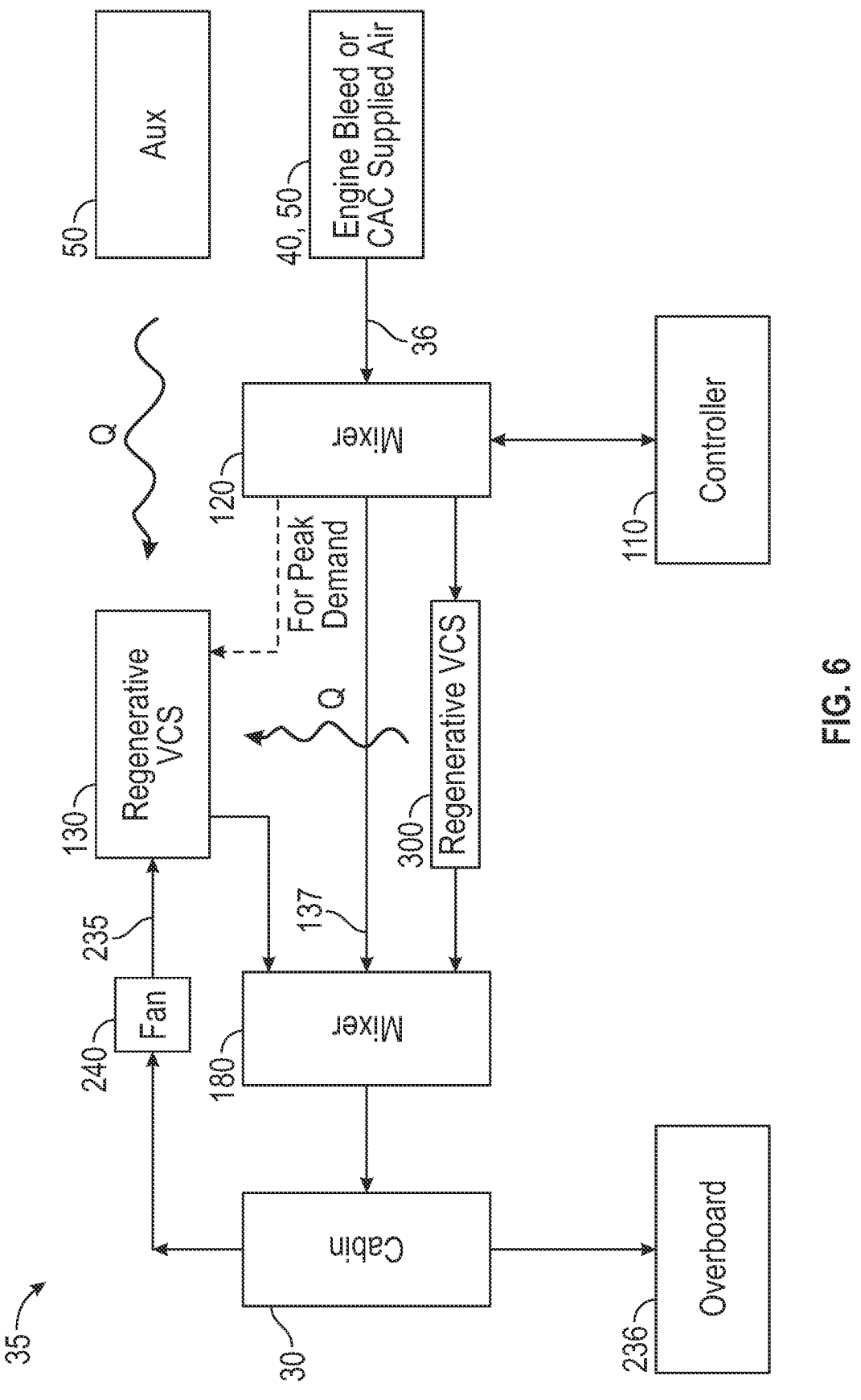
FIG. 6 shows an ECS according to another embodiment, which includes the first VCS and a second VCS to condition air that is directed to a cabin.

In the embodiment shown in FIGS. 5 and 6, an air cycle machine (ACM) 240 is connected in parallel with the first VCS 130, between the first mixer 120 and the second mixer 180. The ACM 240 includes an ACM compressor 250, an ACM turbine 260 located downstream of the ACM compressor 250, and an ACM interconnecting shaft 270 coupling the ACM compressor 250 and the ACM turbine 260. The ACM compressor 250 receives the ECS supply air 36 from the first mixer 120, compresses the ECS supply air 36, and directs the ECS supply air 36 toward the ACM turbine 260. The ACM turbine 260 drives the ACM compressor 250 and directs the ECS supply air 36 toward the second mixer 180.

The first VCS 130 includes a second auxiliary heat exchanger 280 located between the first condenser 150 and the first turbine 160. The second auxiliary heat exchanger 280 is coupled to the ACM compressor 250 and the ACM turbine 260. This further heats the first working fluid 135 before it enters the first turbine 160, further increasing its operational efficiency. From this configuration, the second auxiliary heat exchanger 280 is configured to condition an ECS supply air 36 while the evaporators 170, 230 selectively condition air to the cabin 30.

In one embodiment, the ACM 240 includes a RAM air heat exchanger 290 coupled to the to the ACM compressor 250 and the ACM turbine 260. The RAM air heat exchanger 290 provides supplemental conditioning of the ECS supply air 36.

An ACM drive 295 may be operationally coupled to the ACM compressor 250. The ACM drive 295 may operate in a first mode to drive the ACM compressor 250 and in a second mode to be driven by the ACM turbine 260, similarly to the first drive 185.

In operation, the ECS controller 110, in predetermined operational conditions, controls the first mixer 120 to direct the ECS supply air 36 to the second mixer 180 via one or more of the first VCS 130, the bypass 137 and the ACM 240. This may depend on the required temperature at the cabin 30, which may be determined via a reference temperature measured at an inlet of the cabin 30. The system 35 may be configured to utilize the ACM 240 as the primary source of conditioned air that is directed to the cabin 30. Air conditioned via the first VCS 130 may be utilized, e.g., during peak demand periods, and the first VCS 130 may be otherwise utilized to condition airflow through the ACM 240 and to condition flow for the auxiliary system 50. The second mixer 180 directs the ECS supply air 36 to the cabin 30. In conditions where cabin air is not being recycled, it may be sent overboard 236.

Utilizing the above configuration, the RAM air heat exchanger 290 is optionally not utilized and may be omitted. This is because the second auxiliary heat exchanger 280 in the first VCS 130 may effectively cool air flowing through the ACM 240. Sparingly utilizing a RAM air door, or not utilizing it at all, reduces aerodynamic inefficiencies, resulting in greater fuel efficiencies.

Figure 7:
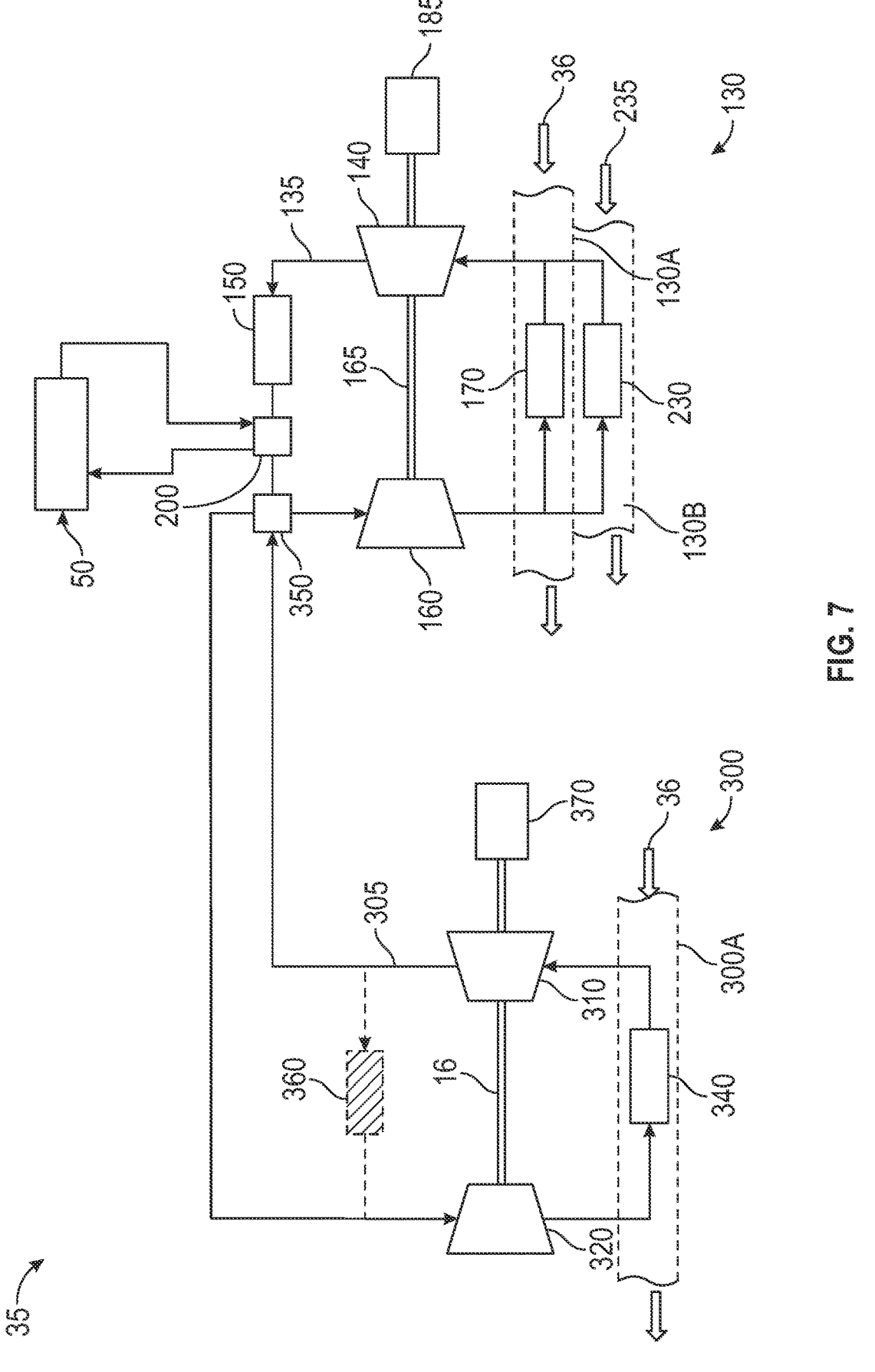
FIG. 7 shows components of the first VCS and the second VCS and their interactions, in which heat from the second VCS and the auxiliary system are utilized to heat the first working fluid entering the first turbine of the VCS.

Turning to FIGS. 6 and 7, in one embodiment the ECS 35 includes the ECS controller 110. The first mixer 120 is operationally coupled to the ECS controller 110. The first mixer 120 receives the ECS supply air 36. The first vapor cycle system (VCS) 130 is downstream of the first mixer 120 and fluidly coupled to the first mixer 120.

The first VCS 130 includes the first working fluid 135 such as refrigerant. The first VCS 130 includes the first compressor 140, the first condenser 150 located downstream of the first compressor 140, and the first turbine 160 that is a flash liquid expander (FLE) turbine, located downstream of the first condenser 150. Utilization of the FLE turbine results in the VCS being a regenerative VCS. The first turbine 160 receives the first working fluid 135 as a liquid and outputs the first working fluid 135 as a two-phase mixture. The first interconnecting shaft 165 couples the first compressor 140 and the first turbine 160. The first evaporator 170 is located downstream of the first turbine 160 and upstream of the first compressor 140. The second mixer 180 is located downstream of the first VCS 130 and operationally coupled to the ECS controller 110. The bypass 137 is connected in parallel with the first VCS 130, between the first mixer 120 and the second mixer 180.

The first drive 185 is operationally coupled to the first compressor 140. The first drive is configured to operate in the first mode to drive the first compressor 140, e.g., at startup of the ECS 35, and in the second mode to be driven by the first turbine 160, e.g., once the first turbine 160 is capable of driving the first compressor 140.

In one embodiment, the first VCS 130 may further include the first auxiliary heat exchanger 200 located between the first condenser 150 and the first turbine 160. The first heat exchanger 200 is configured to cool and condition flow, which may also be refrigerant, from the auxiliary system 50.

The first VCS 130 includes the second evaporator 230 coupled in parallel with the first evaporator 170, between the first compressor 140 and the first turbine 160. The first fan 240 is configured to direct cabin air 235 to the second mixer 180 via the second evaporator 230 of the first VCS 130 to condition the cabin air 235. The cabin air 235 and the ECS supply air 36 are isolated from each other in the first VCS 130, e.g., utilizing separate ducts 130A, 130B, for avoiding cross-contamination.

In the embodiment of FIGS. 6 and 7, a second VCS 300 is connected in parallel with the first VCS 130, between the first mixer 120 and the second mixer 180. The second VCS 300 includes a second VCS working fluid 305, which may also be refrigerant, a second VCS compressor 310, and a second VCS turbine 320 located downstream of the second VCS compressor 310. The second VCS turbine 320 may also be an FLE turbine. A second VCS interconnecting shaft 330 couples the second VCS compressor 310 and the second VCS turbine 320. A second VCS evaporator 340 is located downstream of the second VCS turbine 320 and upstream of the second VCS compressor 310.

The first VCS 130 includes a third (another) auxiliary heat exchanger 350 located between the first condenser 150 and the first turbine 160. The third auxiliary heat exchanger 350 is coupled to the second VCS compressor 310 and the second VCS turbine 320. From this configuration, the third auxiliary heat exchanger 350 is configured to condition the second VCS working fluid 305. This further heats the first working fluid 135 before it enters the first turbine 160, further increasing its operational efficiency.

In one embodiment, the second VCS 300 includes a second VCS condenser 360 coupled to the to the second VCS compressor 310 and the second VCS turbine 320. The second VCS 300 may provide supplemental conditioning of the second VCS working fluid 305. However, the second VCS condenser may be optional as the second VCS working fluid 305 is cooled via the first VCS 130.

A second VCS drive 380 may be operationally coupled to the second VCS compressor 310. The second VCS drive 380 may be configured to operate in a first mode to drive the second VCS compressor 310 and in a second mode to be driven by the second VCS turbine 320, similarly to the first drive 185.

In operation, the ECS controller 110, in predetermined operational conditions, controls the first mixer 120 to direct the ECS supply air 36 to the second mixer 180 via one or more of the first VCS 130, the bypass 137 and the second VCS 300. This may depend on the required temperature at the cabin 30, which may be determined via a reference temperature measured at an inlet of the cabin 30. The system 35 may be configured to utilize the second VCS 300 as the primary source of conditioned air that is directed to the cabin 30. That is, the first mixer 120 may direct the ECS supply air 36 to the second mixer 180 via a duct 300A surrounding the second VCS evaporator 340 in the second VCS 300. Air conditioned via the first VCS 130 may be utilized, e.g., during peak demand periods, and the first VCS 130 may be otherwise utilized to condition flow of the working fluid through the second VCS 300 and to condition flow for the auxiliary system 50. The second mixer 180 directs the ECS supply air 36 to the cabin 30. In conditions where cabin air is not being recycled, it may be sent overboard 236.

Figure 8:
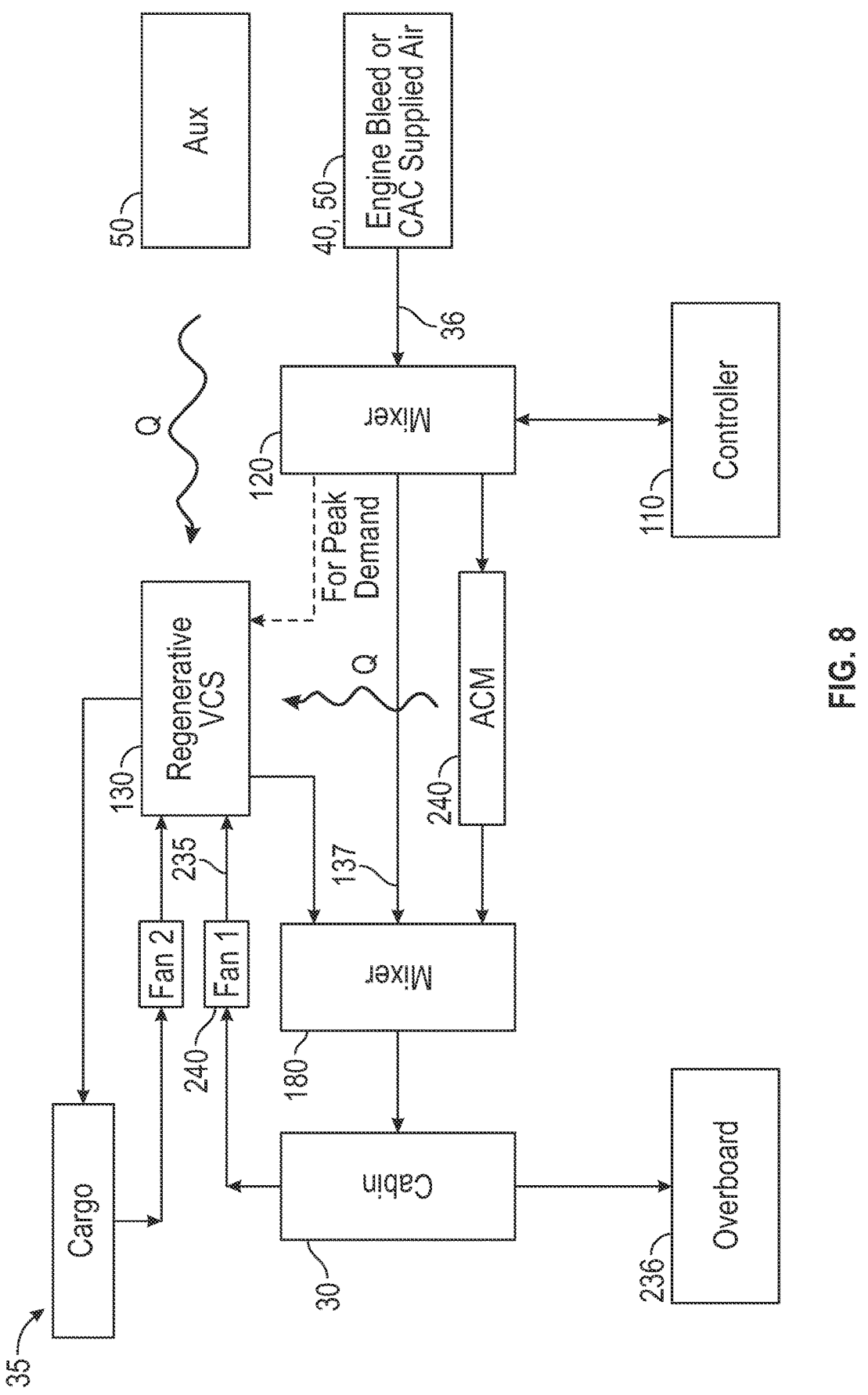
FIG. 8 shows an ECS according to another embodiment, which includes the first VCS and the ACM and in which the first VCS is configured to condition air directed to a cargo bay.
Figure 9:
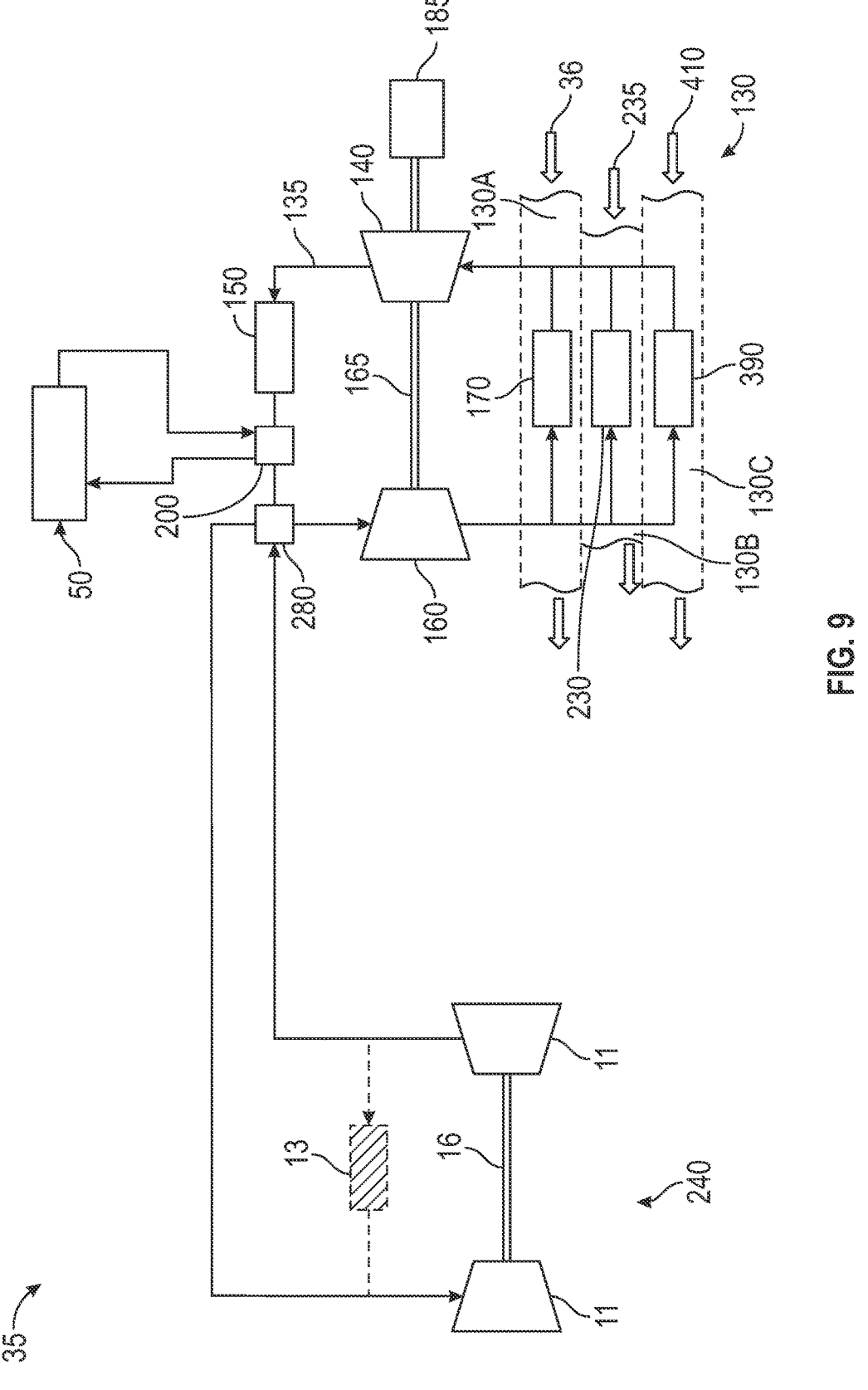
FIG. 9 shows components of the first VCS and the ACM and their interactions, in which heat from the ACM and the auxiliary system are utilized to heat the first working fluid entering the first turbine of the VCS.

Turning to FIGS. 8 and 9, in one embodiment the ECS 35 includes the ECS controller 110. The first mixer 120 is operationally coupled to the ECS controller 110. The first mixer 120 receives the ECS supply air 36. The first vapor cycle system (VCS) 130 is downstream of the first mixer 120 and fluidly coupled to the first mixer 120.

The first VCS 130 includes the first working fluid 135 such as refrigerant. The first VCS 130 includes the first compressor 140, the first condenser 150 located downstream of the first compressor 140, and the first turbine 160 that is a flash liquid expander (FLE) turbine, located downstream of the first condenser 150. Utilization of the FLE turbine results in the VCS being a regenerative VCS. The first turbine 160 receives the first working fluid 135 as a liquid and outputs the first working fluid 135 as a two-phase mixture. The first interconnecting shaft 165 couples the first compressor 140 and the first turbine 160. The first evaporator 170 is located downstream of the first turbine 160 and upstream of the first compressor 140. The second mixer 180 is located downstream of the first VCS 130 and operationally coupled to the ECS controller 110. The bypass 137 is connected in parallel with the first VCS 130, between first mixer 120 and the second mixer 180.

The first drive 185 is operationally coupled to the first compressor 140. The first drive is configured to operate in the first mode to drive the first compressor 140, e.g., at startup of the ECS 35, and in the second mode to be driven by the first turbine 160, e.g., once the first turbine 160 is capable of driving the first compressor 140.

In one embodiment, the first VCS 130 may further include the first auxiliary heat exchanger 200 located between the first condenser 150 and the first turbine 160. The first heat exchanger 200 is configured to cool and condition flow, which may also be refrigerant, from the auxiliary system 50.

The first VCS 130 includes the second evaporator 230 coupled in parallel with the first evaporator 170, between the first compressor 140 and the first turbine 160. The first fan 240 is configured to direct cabin air 235 to the second mixer 180 via the second evaporator 230 of the first VCS 130 to condition the cabin air 235. The cabin air 235 and the ECS supply air 36 are isolated from each other in the first VCS 130, e.g., utilizing separate ducts 130A, 130B, for avoiding cross-contamination.

The air cycle machine (ACM) 240 is connected in parallel with the first VCS 130, between the first mixer 120 and the second mixer 180. The ACM 240 includes the ACM compressor 250, an ACM turbine 260 located downstream of the ACM compressor 250, and the ACM interconnecting shaft 270 coupling the ACM compressor 250 and the ACM turbine 260. The ACM compressor 250 receives the ECS supply air 36 from the first mixer 120, compresses the ECS supply air 36, and directs the ECS supply air 36 toward the ACM turbine 260. The ACM turbine 260 drives the ACM compressor 250 and directs the ECS supply air 36 toward the second mixer 180.

The first VCS 130 includes the second auxiliary heat exchanger 280 located between the first condenser 150 and the first turbine 160. The second auxiliary heat exchanger 280 is coupled to the ACM compressor 250 and the ACM turbine 260. This further heats the first working fluid 135 before it enters the first turbine 160, further increasing its operational efficiency. From this configuration, the second auxiliary heat exchanger 280 is configured to efficiently condition an ECS supply air 36 while the evaporators 170, 230 selectively condition air to the cabin 30 and the cargo bay 33.

In one embodiment, the ACM 240 includes the RAM air heat exchanger 290 coupled to the to the ACM compressor 250 and the ACM turbine 260. The RAM air heat exchanger 290 provides supplemental conditioning of the ECS supply air 36.

The ACM drive 295 may be operationally coupled to the ACM compressor 250. The ACM drive 295 may operate in the first mode to drive the ACM compressor 250 and in the second mode to be driven by the ACM turbine 260, similarly to the first drive 185.

In the embodiment shown in FIGS. 8 and 9, the first VCS 130 includes a third evaporator 390 coupled in parallel with the first evaporator 170 and the second evaporator 230, between the first compressor 140 and the first turbine 160. A second fan 400 is configured to direct cargo bay air 410 from a cargo bay 33 to the first VCS 130, for conditioning via the third evaporator 390, and back to the cargo bay 33. The cabin air 235, and the ECS supply air 36 and the cargo bay air 410 are isolated from each other in the first VCS 130, e.g., via separate ducts 130A, 130B, 130C.

In operation, the ECS controller 110, in predetermined operational conditions, controls the first mixer 120 to direct the ECS supply air 36 to the second mixer 180 via one or more of the first VCS 130, the bypass 137 and the ACM 240. This may depend on the required temperature at the cabin 30, which may be determined via a reference temperature measured at an inlet of the cabin 30. The system 35 may be configured to utilize the ACM 240 as the primary source of conditioned air that is directed to the cabin 30. Air conditioned via the first VCS 130 may be utilized, e.g., during peak demand periods, and the first VCS 130 may be otherwise utilized to condition airflow through the ACM 240 and to condition flow for the auxiliary system 50. The second mixer 180 directs the ECS supply air 36 to the cabin 30. In conditions where cabin air is not being recycled, it may be sent overboard 236.

Utilizing the above configuration, the RAM air heat exchanger 290 is optionally not utilized and may be omitted. This is because the second heat exchanger 280 in the first VCS 130 may effectively cool air flowing through the ACM 240. Sparingly utilizing a RAM air door, or not utilizing it at all, reduces aerodynamic inefficiencies, resulting in greater fuel efficiencies. In addition, the efficiency of the first turbine 160 may be such that it is capable of selectively cooling air directed to the cabin and the cargo bay.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An environmental control system (ECS) of an aircraft for delivering ECS supply air to a cabin, the system comprising:

an ECS controller;

a first mixer that is operationally coupled to the ECS controller, the first mixer receives the ECS supply air;

a first vapor cycle system (VCS) that is downstream of the first mixer and fluidly coupled to the first mixer, wherein, the first VCS includes:

a first working fluid;

a first compressor;

a first condenser located downstream of the first compressor;

a first turbine that is a flash liquid expander (FLE) turbine, located downstream of the first condenser, that receives the first working fluid as a liquid and outputs the first working fluid as a two-phase mixture;

a first interconnecting shaft coupling the first compressor and the first turbine;

a first evaporator located downstream of the first turbine and upstream of the first compressor;

a second mixer located downstream of the first VCS and operationally coupled to the ECS controller; and a bypass connected in parallel with the first VCS, between the first mixer and the second mixer, wherein, in operation:

the ECS controller, in predetermined operational conditions, controls the first mixer to direct the ECS supply air to the second mixer via one or both of the first VCS and the bypass; and the second mixer directs the ECS supply air to the cabin.

2. The system of claim 1, wherein the first working fluid is a refrigerant.

3. The system of claim 1, further including
a first drive operationally coupled to the first compressor, and configured to operate in a first mode to drive the first compressor and in a second mode to be driven by the first turbine.

4. The system of claim 3, wherein
the first VCS further includes a first auxiliary heat exchanger located between the first condenser and the first turbine and configured to cool air from an auxiliary heat source.

5. The system of claim 4, wherein:
the first VCS includes a second evaporator coupled in parallel with the first evaporator, between the first compressor and the first turbine;
a first fan that is configured to direct cabin air to the second mixer via the second evaporator of the first VCS to condition the cabin air, and wherein the cabin air and the ECS supply air are isolated from each other in the first VCS.

6. The system of claim 5, wherein system further includes:
an air cycle machine (ACM), connected in parallel with the first VCS, between the first mixer and the second mixer,
wherein, in operation:
   the ECS controller, in the predetermined operational conditions, controls the first mixer to direct the ECS supply air to the second mixer via one or more of the first VCS, the bypass and the ACM; and
   the second mixer directs the ECS supply air to the cabin.

7. The system of claim 6, wherein the ACM includes:
an ACM compressor;
an ACM turbine located downstream of the ACM compressor;
an ACM interconnecting shaft coupling the ACM compressor and the ACM turbine,
wherein, in operation:
   the ACM compressor receives the ECS supply air from the first mixer, compresses the ECS supply air, and directs the ECS supply air toward the ACM turbine; and
   the ACM turbine drives the ACM compressor and directs the ECS supply air toward the second mixer.

8. The system of claim 7, wherein:
the first VCS includes a second auxiliary heat exchanger located between the first condenser and the first turbine; and
the second auxiliary heat exchanger is coupled to the ACM compressor and the ACM turbine, whereby the second auxiliary heat exchanger is configured to condition the ECS supply air.

9. The system of claim 8, wherein:
the ACM includes a RAM air heat exchanger coupled to the to the ACM compressor and the ACM turbine, to provide supplemental conditioning of the ECS supply air.

10. The system of claim 8, wherein the ACM further includes:
an ACM drive operationally coupled to the ACM compressor, and configured to operate in a first mode to drive the ACM compressor and in a second mode to be driven by the ACM turbine.

11. The system of claim 5, wherein system further includes:
a second VCS, connected in parallel with the first VCS, between the first mixer and the second mixer,
wherein, in operation:
   the ECS controller, in the predetermined operational conditions, controls the first mixer to direct the ECS supply air to the second mixer via one or more of the first VCS, the bypass and the second VCS; and the second mixer directs the ECS supply air to the cabin.

12. The system of claim 11, wherein the second VCS includes:
a second VCS working fluid;
a second VCS compressor;
a second VCS turbine located downstream of the second VCS compressor;
a second VCS interconnecting shaft coupling the second VCS compressor and the second VCS turbine; and
a second VCS evaporator located downstream of the second VCS turbine and upstream of the second VCS compressor,
wherein, in operation:
   the ECS controller, in the predetermined operational conditions, controls the first mixer to direct the ECS supply air to the second mixer via the one or more of the first VCS, the bypass and the second VCS where and the second VCS evaporator in the second VCS conditions the ECS supply air; and
   the second mixer directs the ECS supply air to the cabin.

13. The system of claim 12, wherein the second VCS turbine is an FLE turbine.

14. The system of claim 12, wherein the second VCS working fluid is a refrigerant.

15. The system of claim 12, wherein:
the first VCS includes a another auxiliary heat exchanger located between the first condenser and the first turbine, and
the another auxiliary heat exchanger is coupled to the second VCS compressor and the second VCS turbine, whereby the another auxiliary heat exchanger is configured to condition the second VCS working fluid.

16. The system of claim 12, wherein:
the second VCS includes a second VCS condenser coupled to the to the second VCS compressor and the second VCS turbine, to provide supplemental conditioning of the second VCS working fluid.

17. The system of claim 12, wherein the second VCS further includes:
a second VCS drive operationally coupled to the second VCS compressor, and configured to operate in a first mode to drive the second VCS compressor and in a second mode to be driven by the second VCS turbine.

18. The system of claim 5, wherein:
the first VCS includes a third evaporator, coupled in parallel with the first evaporator and the second evaporator, between the first compressor and the first turbine;
a second fan that is configured to direct cargo bay air from a cargo bay to the first VCS, for conditioning via the third evaporator, and back to the cargo bay, and
wherein the cabin air, the ECS supply air and the cargo bay air are isolated from each other in the first VCS.

* * * * *